United States Patent
Fei et al.

(10) Patent No.: US 8,213,203 B2
(45) Date of Patent: Jul. 3, 2012

(54) METHOD AND APPARATUS FOR CONTROLLING A CONSTANT CURRENT OUTPUT IN A SWITCHING MODE POWER SUPPLY

(75) Inventors: Ruixia Fei, Shanghai (CN); Tao Sun, Shanghai (CN); QingHua Su, Shanghai (CN); Huizhen Zhu, Shanghai (CN)

(73) Assignee: BCD Semiconductor Manufacturing Limited (KY)

( * ) Notice: Subject to any disclaimer, the term of this patent is extended or adjusted under 35 U.S.C. 154(b) by 355 days.

(21) Appl. No.: 12/620,420

(22) Filed: Nov. 17, 2009

(65) Prior Publication Data

US 2010/0238689 A1   Sep. 23, 2010

(30) Foreign Application Priority Data

Mar. 20, 2009 (CN) .................. 200910129471.1

(51) Int. Cl.
*H02M 7/537* (2006.01)
(52) U.S. Cl. ............ 363/131; 363/21.08; 323/285
(58) Field of Classification Search .......... 363/21.09, 363/21.13, 21.16, 21.17, 21.08, 131, 65, 363/17, 132; 323/282–286, 266, 268, 272, 323/211, 222

See application file for complete search history.

(56) References Cited

U.S. PATENT DOCUMENTS

| | | | |
|---|---|---|---|
| 6,404,654 B1 | 6/2002 | Wang | |
| 6,674,271 B2 | 1/2004 | Choo et al. | |
| 6,943,535 B1 | 9/2005 | Schiff | |
| 6,980,442 B2 | 12/2005 | Lv et al. | |
| 7,313,004 B1 | 12/2007 | Yang et al. | |
| 2005/0212501 A1 | 9/2005 | Acatrinei | |
| 2007/0121258 A1 | 5/2007 | Hachiya | |
| 2007/0210772 A1 | 9/2007 | Sawtell | |
| 2008/0310191 A1 | 12/2008 | Zhu et al. | |

OTHER PUBLICATIONS

Non-Final Office Action for U.S. Appl. No. 12/136,760, mailed on Aug. 4, 2011, 24 pages.
Chen et al., "*Reduction of Power Supply EMI Emission by Switching Frequency Modulation*," IEEE Power Electronics and Drive System Conference 1993; pp. 127-133.
Stankovich et al., "*Analysis and Synthesis of Randomized Modulation Schemes for Power Converters*," IEEE Transactions of Power Electronics, vol. 10, No. 6, Nov. 1995, pp. 680-693.
Non-Final Office Action for U.S. Appl. No. 12/136,760, mailed on Apr. 26, 2012, 12 pages.

*Primary Examiner* — Rajnikant Patel
(74) *Attorney, Agent, or Firm* — Kilpatrick Townsend & Stockton LLP

(57) ABSTRACT

A controller for providing a constant output current control signal in a switched mode power supply (SMPS) includes a conduction time compensation circuit that is configured to produce a compensated conduction time interval signal that includes compensation for a ringing waveform of a feedback signal. The compensated signal reflects more accurately the actual conductive time of a rectifying diode in a secondary winding of the switched mode power supply. In one embodiment, the compensated conduction time interval signal is used to generate a fixed ratio between the conduction time and the non-conduction time of the rectifying diode. In another embodiment, the controller also provides a constant voltage control signal.

29 Claims, 11 Drawing Sheets

METHOD AND APPARATUS FOR CONTROLLING A CONSTANT CURRENT OUTPUT IN A SWITCHING MODE POWER SUPPLY

CROSS-REFERENCES TO RELATED APPLICATIONS

This application claims the benefit of China Patent Application No. 200910129471.1 filed Mar. 20, 2009, commonly owned and incorporated by reference herein.

This application is also related to U.S. patent application Ser. No. 12/136,760, filed Jun. 10, 2008, commonly owned and incorporated by reference herein.

BACKGROUND OF THE INVENTION

Embodiments of the present invention are directed to power supply control circuits and power supply systems. More particularly, embodiments of the invention provide methods and circuits for controlling an output current in a switched mode power supply (SMPS). Merely by way of example, some embodiments of the invention have been applied to an SMPS constant current controller, such that the output current is substantially independent of variations of AC mains and/or of variations in an output voltage. But it would be recognized that the invention has a much broader range of applicability.

Regulated power supplies are indispensable in modern electronics. For example, the power supply in a personal computer often needs to receive power input from various outlets. Desktop and laptop computers often have regulated power supplies on the motherboard to supply power to the CPU, memories, and periphery circuitry. Regulated power supplies are also used in a wide variety of applications, such as home appliances, automobiles, and portable chargers for mobile electronic devices, etc.

In general, a power supply can be regulated using a linear regulator or a switching mode controller. A linear regulator maintains the desired output voltage by dissipating excess power. In contrast, a switching mode controller rapidly switches a power transistor on and off with a variable duty cycle or variable frequency and provides an average output that is the desired output voltage.

Compared with linear regulators, switching mode power supplies have the advantages of smaller size, higher efficiency and larger output power capability. On the other hand, they also have the disadvantages of greater noise, especially Electromagnetic Interference at the power transistor's switching frequency or its harmonics.

Pulse Width Modulation (PWM) and Pulse Frequency Modulation (PFM) are two control architectures of switching mode power supplies. In recent years, green power supplies are emphasized, which require higher conversion efficiency and lower standby power consumption. In a PWM controlled switching mode power supply, the system can be forced to enter into burst mode in standby conditions to reduce power consumption. In a PFM controlled switching mode power supply, the switching frequency can be reduced in light load conditions. PFM-controlled switching mode power supply exhibits simple control topology and small quiescent current. Therefore, it is suitable for low cost small output power applications such as battery chargers and adapters.

In such a switched mode power supply system, a switch is connected to the primary winding of the transformer. Magnetic energy is stored in the inductance of the primary winding when the switch is turned on, and the energy is transferred to the secondary winding when the switch is turned off. The energy transfer results in a current flowing through the secondary winding and the rectifying diode. When the energy transfer is completed, i.e., the current stops flowing through the diode, a substantially sinusoidal oscillation of decreasing amplitude appears at the secondary winding. The frequency of the sinusoidal oscillation is determined, in part, by the inductance of the primary winding and by the parasitic capacitance in the primary winding as well in the printed circuit board. The effect of these components often are difficulty to determine in advance and can lead to output performance limitations in the switched mode power supply. Some of these limitations are described in more detail below.

Therefore, there is a need for techniques that can provide more precise control of output current-voltage characteristics in a power supply

BRIEF SUMMARY OF THE INVENTION

Embodiments of the present invention are directed to power supply control circuits. More particularly, some embodiments of the invention provide methods and circuits for controlling an output current in a switched mode power supply. The switched mode power supply usually includes a transformer having a primary-side switch and at least one secondary winding. Merely by way of example, an embodiment of the invention has been applied to a constant current control circuit, which maintains a substantially constant output current in the secondary winding despite variations of the AC mains and/or output voltages.

In an embodiment, a feedback signal, which includes a voltage image of the secondary winding, is received by a PFM controller having a constant voltage controller circuit and a constant current controller circuit. The PFM controller provides a switching control signal to turn on and off the primary-side switch. The constant voltage controller circuit further receives a current sensing signal, which is indicative of a current flowing through the primary side switch, to generate a constant voltage control signal for maintaining a constant output voltage. The constant current controller circuit extracts current flow information of the feedback signal and produces a constant current control signal based on a switching control signal and the current flow information. The combination of the constant voltage and constant current control signals results in an output control signal (i.e., the switching control signal) that turns on and off the primary-side switch to maintain a constant output voltage and constant output current.

An embodiment of the present invention provides a controller for a switched mode power supply (SMPS) which includes a transformer having a primary winding equipped with a switch. The controller includes an output terminal for providing a power supply control signal to turn on and off the switch in the primary side of the power supply, a first input terminal for receiving a feedback signal related to an output current of the power supply, and a second input terminal for receiving a current sensing signal, which is related to a current in the primary winding. The feedback signal exhibits a ringing waveform when the flow of the output current substantially stops.

An embodiment of the controller described above also includes a constant voltage control circuit coupled to the first and second input terminals and configured to produce a constant voltage control signal, a current flow detector circuit coupled to the first input terminal and configured to produce a conduction time interval signal, a time ratio signal generator circuit configured to produce a fixed time ratio signal. The time ratio signal generator circuit has a conduction time compensation circuit configured to receive the conduction time interval signal and produce a compensated conduction time interval signal. The controller also includes a flip-flop configured to provide a constant current control signal in response to the conduction time interval signal and the fixed time ratio signal and a first logic gate coupled to the constant voltage control signal and the constant current control signal and configured to produce the power supply control signal.

In an embodiment of the controller, the conduction time compensation circuit is configured to produce the compensated conduction time interval signal that includes a delay time related to the ringing waveform cycle period. In a specific embodiment, the controller of claim 1 wherein the conduction time compensation circuit is configured to produce the compensated conduction time interval signal that includes a delay time of one quarter of the ringing waveform cycle period.

Another embodiment of the invention provides a circuit for providing a constant output current control signal in a switched mode power supply (SMPS). The SMPS includes a primary-side winding coupled to a switch which receives the constant current control signal, and an auxiliary winding providing a feedback signal which is related to a voltage signal in a secondary winding. The circuit includes a first input terminal for receiving the feedback signal, which exhibits a ringing waveform having a cycle period when a current flow in the secondary winding is discontinued. The circuit also has a current flow detector circuit for receiving the feedback signal and providing a conduction time interval signal. The circuit also includes a time ratio generator circuit having a conduction time compensation circuit configured to receive the conduction time interval signal and produce a compensated conduction time interval signal having a delay time related to the ringing waveform cycle period. The time ratio signal generator circuit is configured to produce a fixed time ratio signal. The circuit is configured to provide the constant current control signal in response to conduction time interval signal and compensated conduction time interval signal.

In a specific embodiment of the above circuit, the conduction time compensation circuit is configured to produce the compensated conduction time interval signal that includes a delay time of one quarter of the ringing waveform cycle period.

Yet another embodiment of the invention provides a switched mode power supply (SMPS) that includes a primary-side winding coupled to a switch, an auxiliary winding providing a feedback signal, which is related to a voltage signal in a secondary winding. The SMPS also has a control circuit for providing a constant current control signal. The circuit includes a first input terminal for receiving the feedback signal, which exhibits a ringing waveform having a cycle period when a current flow in the secondary winding is discontinued. The control circuit also includes a current flow detector circuit for receiving the feedback signal and providing a conduction time interval signal. The control circuit also includes a time ratio generator circuit having a conduction time compensation circuit configured to receive the conduction time interval signal and produce a compensated conduction time interval signal having a delay time related to the ringing waveform cycle period. The time ratio signal generator circuit is configured to produce a fixed time ratio signal. The control circuit is configured to provide the constant current control signal in response to the conduction time interval signal and compensated conduction time interval signal.

In an embodiment of the above SMPS, the current flow detector circuit includes a comparator configured to produce at least one digital pulse based on the zero crossings of the ringing waveform and a conduction time detector configured to generate the conduction time interval signal. In another embodiment, the conduction time compensation circuit is configured to produce the compensated conduction time interval signal that includes a delay time of one quarter of the ringing waveform cycle period. In another embodiment, the conduction time compensation circuit includes a pulse signal generation circuit configured to generate a digital pulse having a half-cycle period pulse width, a pulse signal-to-voltage conversion circuit configured to produce a second voltage signal by charging and discharging a second capacitor under the control of the digital pulse, a delay circuit configured to produce a delayed conduction time interval signal, and a logic gate configured to received the conduction time and delayed conduction time interval signals for generating a compensated conduction time interval signal.

In a specific embodiment of the present invention, a controller includes an output terminal which provides a control signal to turn on and off the switch coupled to a primary winding terminal. The controller also includes a first input terminal for receiving a feedback signal that is an image of a voltage at the secondary winding. The feedback signal exhibits a ringing waveform when a rectifying diode stops conducting, i.e., no current flows through it. The controller also includes a current flow detector circuit that detects a conduction time interval signal based on the received feedback signal. Additionally, the controller includes a time ratio signal generator that generates a conduction time period and a non-conduction time period that has a fixed ratio. The conduction and non-conduction time periods are obtained by comparing a voltage waveform with a reference voltage. The voltage waveform is generated by charging and discharging a capacitor with respective source and sink currents, which have a constant ratio between them. The charging and discharging are controlled by a compensated conduction time interval signal that reduces or eliminates an error in the conduction time interval signal that is caused by the ringing waveform in the feedback signal.

In another embodiment of the present invention, the circuit for suppressing or eliminating an error in the conduction time interval signal includes a first input terminal for receiving the feedback signal, which exhibits a ringing waveform when the rectifying diode stops conducting. The circuit further includes a second input terminal for receiving a switching control signal, which turns on and off the switch coupled to a terminal of the primary winding. The circuit also includes a current flow detection circuit for detecting the conduction time interval of the rectifying diode. The circuit further includes a time ratio signal generator circuit that contains a conduction time compensation circuit for compensating the error of the conduction time interval signal that is caused due to the ringing waveform. The time ratio signal generator produces a conduction time period and a non-conduction time period that has a fixed ratio. Additionally, the circuit includes a flip-flop that generates a constant current control signal in response to the conduction time interval signal and the fixed ratio signal comprising the conduction and a non-conduction time periods.

In yet another embodiment of the present invention, a method is disclosed for controlling an output current of a switched mode power supply, in which the transformer has a primary winding coupled to a switch that is controlled by a switching control signal, and a feedback signal that is an image of a voltage in a secondary winding. The method includes:

receiving the feedback signal that exhibits a ringing waveform with a cycle period;

converting the feedback signal to at least one digital pulse, which has a pulse width corresponding to the half cycle period;

obtaining a conduction time interval signal based on the switching control signal and the at least one digital pulse;

compensating the conduction time interval signal based on the half-cycle period to generate a compensated conduction time interval signal;

generating a fixed time ratio signal by charging and discharging a capacitor with a respective source and sink current to produce a voltage signal, the charging and discharging is controlled by the compensated conduction time interval signal, and by comparing the voltage signal with a reference voltage; and providing a constant current control signal in response to the conduction time interval signal and the fixed time ratio signal.

Various additional features and advantages of the present invention can be further appreciated with reference to the detailed description and accompanying drawings that follow:

DETAILED DESCRIPTION OF THE INVENTION

Figure 1:
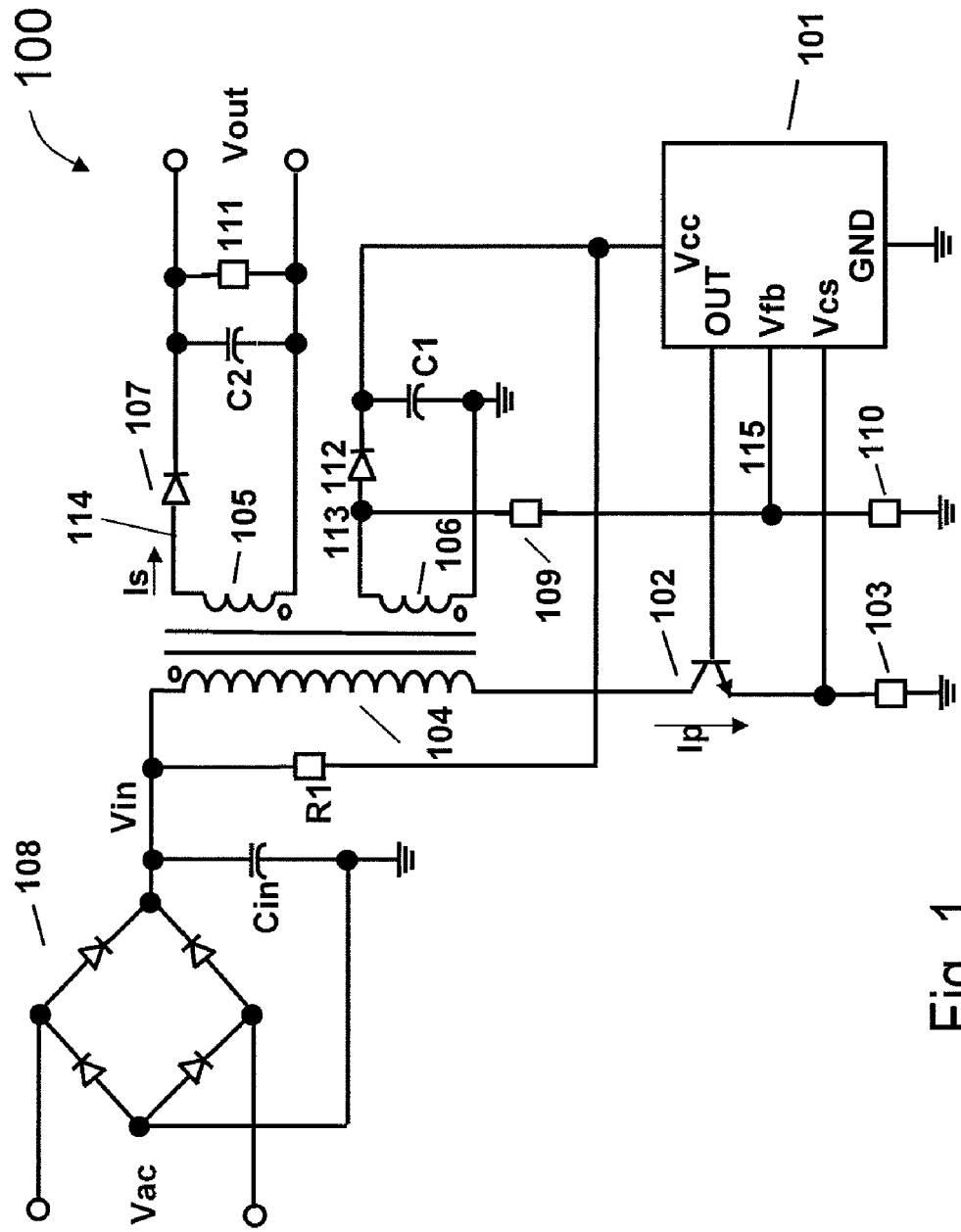
FIG. 1 is a circuit diagram of a conventional primary side regulated switched mode power supply.

FIG. 1 is a circuit diagram of a conventional flyback-type primary side regulated switched mode power supply using a pulse width modulation (PFM) control. The primary side regulated switched mode power supply includes a rectifier 108 that converts an AC mains voltage to an unregulated voltage Vin. A capacitor Cin smoothes voltage Vin, which is then applied to a terminal of a primary winding 104. The another terminal of primary winding 104 is coupled to a transistor 102, which is turned on and off by a signal OUT of a PFM controller 101. When transistor 102 is turned on, a primary current Ip flows through primary winding 104, which starts building up a magnetic energy. A secondary winding 105 is magnetically coupled to primary winding 104 and includes a diode 107 and a capacitor C2, which has a relatively high capacity to stabilize the variation of a voltage Vout applying to a load 111. The polarity (winding sense) of secondary winding 105 is such that the magnetic field produced by primary current Ip (when transistor 102 is turned on) induces a voltage that reverse biases diode 107. When transistor 102 is turned off, the sign of the time derivative of the magnetic field is reversed and a current Is is induced in secondary winding 105. A part of current Is charges capacitor C2 and the rest supplies to load 111. Capacitor C2 maintains an output current flowing in load 111 by partly discharging while secondary current Is stops flowing. This is the case when the energy in the magnetic field has been completely discharged.

In order to maintain a constant current at load 111, an auxiliary winding 106 may be used. In this example, auxiliary winding 106 has the same polarity as that of secondary winding 105 and includes a diode 112 and a capacitor C1, i.e., diode 112 is also reverse biased when transistor 102 is turned on; and an induced current is flowing across diode 112 when transistor 102 is turned off. The induced current flowing across diode 112 could be used as an indicator for controller 101 to control switch transistor 102 for obtaining a constant current through load 111. However, the induced current often cannot be easily monitored. An alternative solution is to monitor a voltage waveform at node 113 of auxiliary winding 106. For that, a resistor 109 is coupled to node 113 to pick up the voltage waveform, which may be further attenuated with a resistor 110 to form a feedback signal Vfb at node 115. In one embodiment, feedback signal Vfb may be an image of the voltage at a node 114 of secondary winding 105, i.e., Vfb is in the first order linearly proportional to the voltage at node 114 adjusted by a turns ratio and the voltage divider ratio.

While transistor 102 is turned on, primary current Ip through a current sensing resistor 103, which produces a voltage Vcs for controller 101. In one embodiment, transistor 102 is turned on if Vcs is below a predetermined value, and transistor 102 is turned off if Vcs is above the predetermined value.

Figure 2:
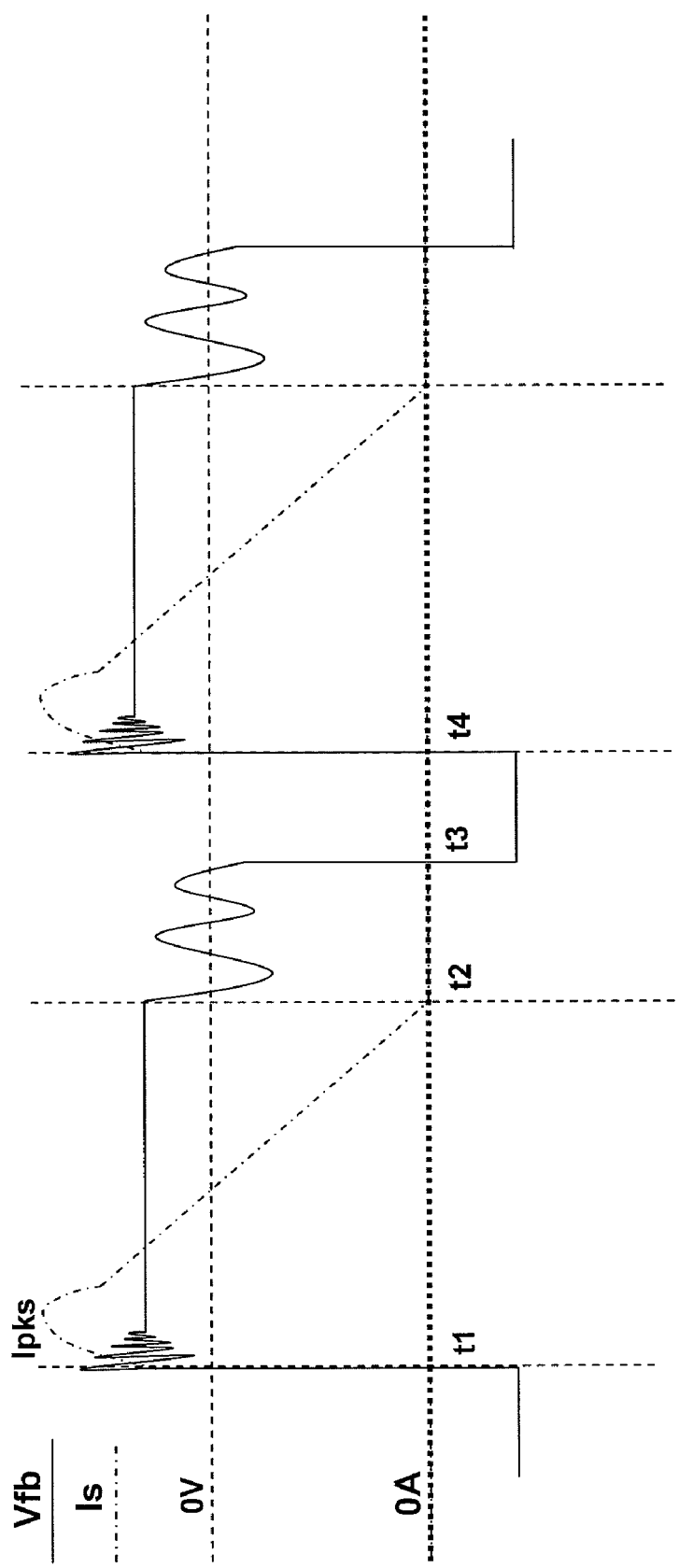
FIG. 2 shows voltage and current waveforms in a secondary winding of a conventional primary-side regulated switched mode power supply.

FIG. 2 shows typical waveforms of feedback signal Vfb and current Is when transistor 102 is turned on and turned off. At time t1, transistor 102 is turned off, the energy of the magnetic field in primary winding 104 is transferred to respective secondary and auxiliary windings 105 and 106. Diodes 107 and 112 are conducting, a peak current Ipks is flowing through diode 107 and feedback signal Vfb shows at first some ringing or oscillations before settling down to an average value while current Is is flowing. At time t2, the energy of the magnetic field stored in primary winding 104 is completely discharged, there are no currents flowing in the primary, secondary and auxiliary windings. As current Is drops to zero, feedback signal Vfb shows a series of undershoots and overshoots with damping magnitudes around the ground potential. The undershoots and overshoots have a damped sinusoid ringing waveform with an approximately constant frequency, and the DC level of the ringing waveform is zero. At time t3, transistor 102 is turned on, Vfb is going negative, i.e., diodes 107 and 112 are reverse-biased. Current Ip starts to flow through primary winding 104, which stores the energy of the magnetic field and releases it again to secondary and auxiliary windings 105 and 106 at time t4 when transistor 102 is turned off.

The frequency of the ringing waveform is determined by the inductance of primary winding 104, its parasitic capacitance, and other parasitic capacitances related to the PCB layout of the power supply. The frequency of the sinusoidal ringing waveform can be calculated with the expression:

$$fring = \frac{1}{2\pi\sqrt{LpCtot}} \quad (1)$$

where Lp is the inductance of the primary winding 104, and Ctot is the total capacitance. It follows that the period of the sinusoidal ringing waveform is:

$$Tring = 2\pi\sqrt{LpCtot} \quad (2)$$

As shown in FIG. 2, while current Is drops to zero, at t2, feedback signal Vfb is not yet zero due to the ringing waveform. In some examples, feedback signal Vfb goes to zero after approximately a quarter of one cycle period of the sinusoidal. When a PWM or PFM controller utilizes the zero-crossing of feedback signal Vfb as an indicator for the conduction time of diode 107, it will likely include an error, which corresponds to about a quarter period of the ringing waveform.

Figure 3:
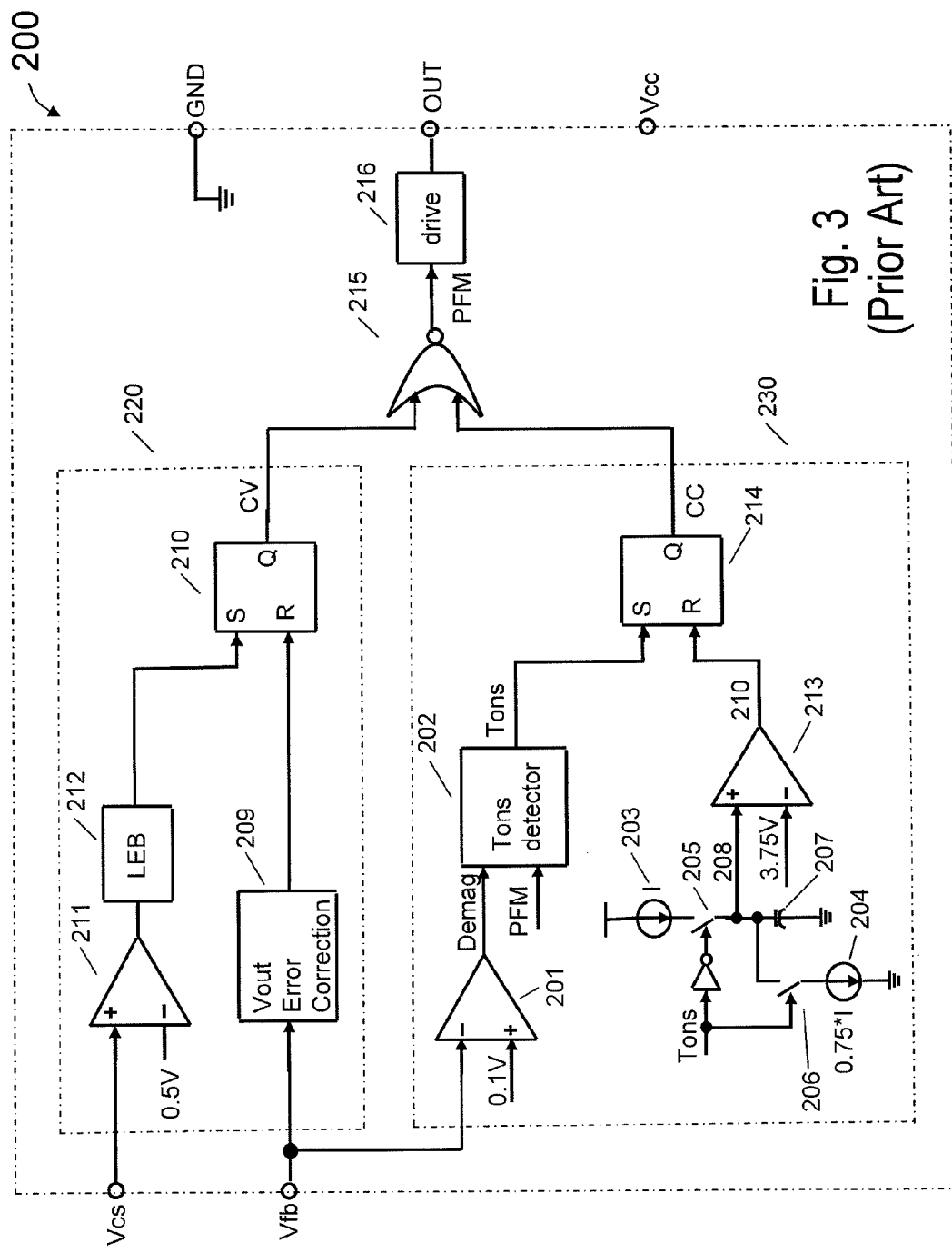
FIG. 3 is a circuit diagram of an output voltage and output current controller in a conventional pulse frequency modulated (PFM) power supply.

FIG. 3 is a circuit diagram of a conventional constant output voltage and constant output current PFM controller 200, which is also shown as block 101 in FIG. 1. PFM controller 200 includes a constant voltage control circuit 220 and a constant current control circuit 230. Constant voltage control circuit 220 includes a comparator 211 that receives a voltage Vcs. Voltage Vcs is used to sense primary current Ip flowing through primary winding 104. In one embodiment, if voltage Vcs is higher than 0.5V, the output of comparator 211 will be at logic high level and sets the output of an RS flip-flop 210, i.e., a voltage control signal CV, to a logic high. In one embodiment, comparator 211 is further coupled to a leading edge blanking circuit (LEB) 212, which has integrated a certain leading edge blanking time to block any spikes occurring at sense resistor 103 when transistor 102 is turned on. Constant voltage control circuit 220 further includes a Vout error correction circuit 209, which is coupled to feedback signal Vfb. Vout error correction circuit 209 compares Vfb with a reference voltage (not shown) to determines a voltage error, processes the voltage error for generating a reset signal to RS flip-flop 210. Constant voltage control circuit 220 thus produces a constant voltage control signal CV that constitutes a part of a switching control signal PFM, which is further buffered through a drive 216 to produce an output OUT for switching transistor 102.

Constant current control circuit 230 includes a demagnetization detector 201 that compares feedback signal Vfb with a 0.1V reference voltage to detect the demagnetization of primary winding 104. Demagnetization detector 201 is coupled to a Tons detector 202, which also receives switching control signal PFM to produce a conduction time interval signal Tons. The logic high state of conduction time interval signal Tons is indicative of current Ip flowing through secondary winding 105.

In one example, conduction time interval signal Tons and non-conduction time interval signal Toffs have a ratio of 4/3, i.e., Tons has a relative interval time of 4 whereas Toffs has a relative interval time of 3 as shown in FIG. 2. In one example, the 4/3 ratio of Tons/Toffs can be generated using a capacitor that is charged with a source current and discharged with a sink current, which is ¾ of the source current, shown as current 204 in FIG. 3. The time ratio signal generator includes a capacitor 207 that is charged with a source current 203 through a switch 205. Capacitor 207 is discharged with a sink current 204 through a switch 206. Sink current 204 is 0.75 of source current 203. Switches 205 and 206 are controlled by conduction time interval signal Tons that represents an approximate conductive state of diode 107 in secondary winding 105. The charge and discharge of capacitor 207 produces a voltage signal at node 208, which is compared with a reference voltage 3.75V at a comparator 213. Output 210 of comparator 213 thus has a time ratio signal of 4/7 where 4 is the relative time interval of Tons and 7 is the total period of the voltage signal at node 208.

As described above, Tons is not an accurate representation of the conductive state of diode 107 because it is derived from feedback signal Vfb that exhibits a ringing waveform when current Ip drops to zero. This inaccurate representation of the conductive state in secondary winding results in a variation of output currents under different AC mains and output voltages.

Figure 4:
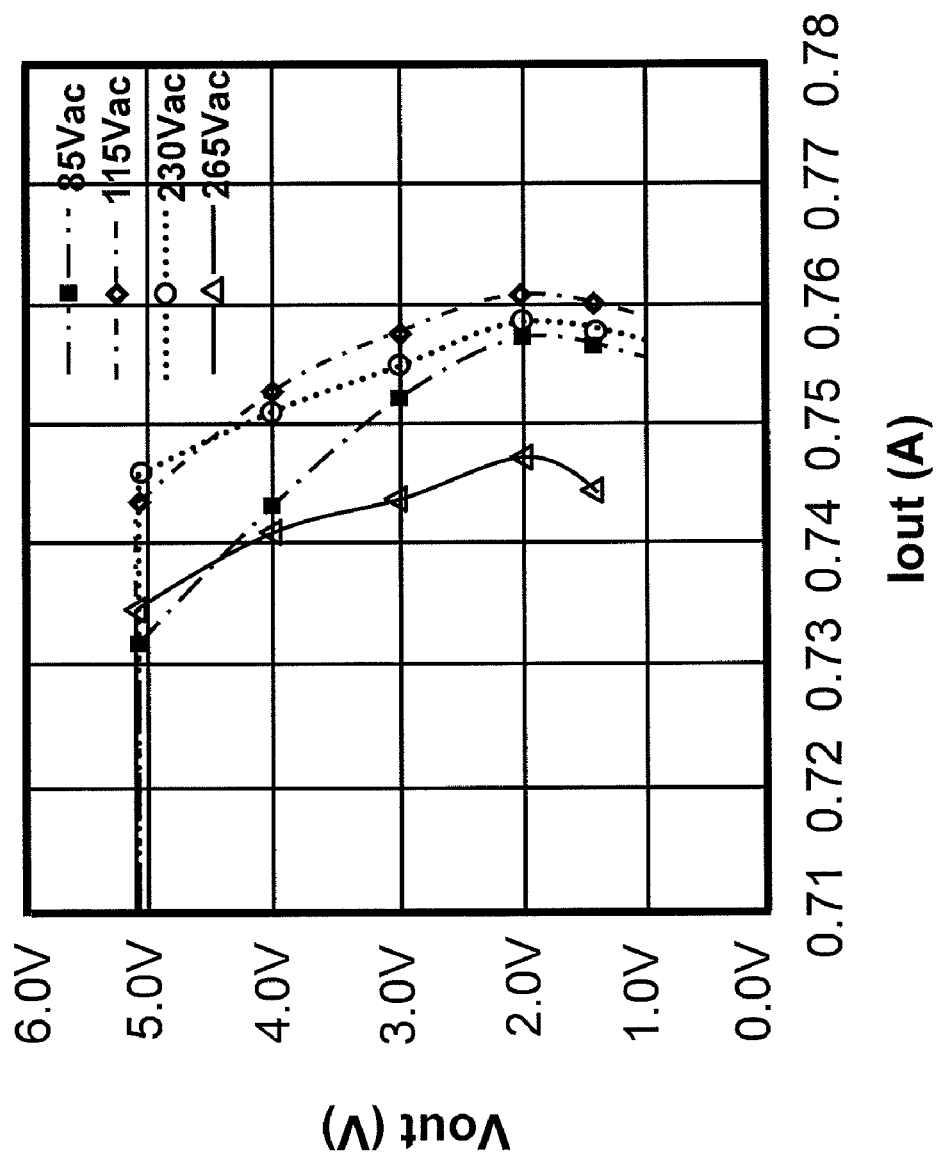
FIG. 4 shows four examples of the output voltage as a function of the output current in a conventional primary-side regulated switched mode power supply.

FIG. 4 shows four examples of output voltage as a function of output current in a conventional primary-side regulated switched mode power supply utilizing controller 200 of FIG. 3. As can be seen, output currents exhibit a variation of about 15 mA under different AC mains voltages (85 Vac to 265 Vac) when the system output voltage is kept at 5 V. Output currents also exhibit a variation of about 15-25 mA when the system output voltage varies from 1.5 V to 5 V. This variation of output currents may not be suitable for some battery charger applications. According to embodiments of the present invention, the causes of the output current variation are described below using specific examples.

Figure 5:
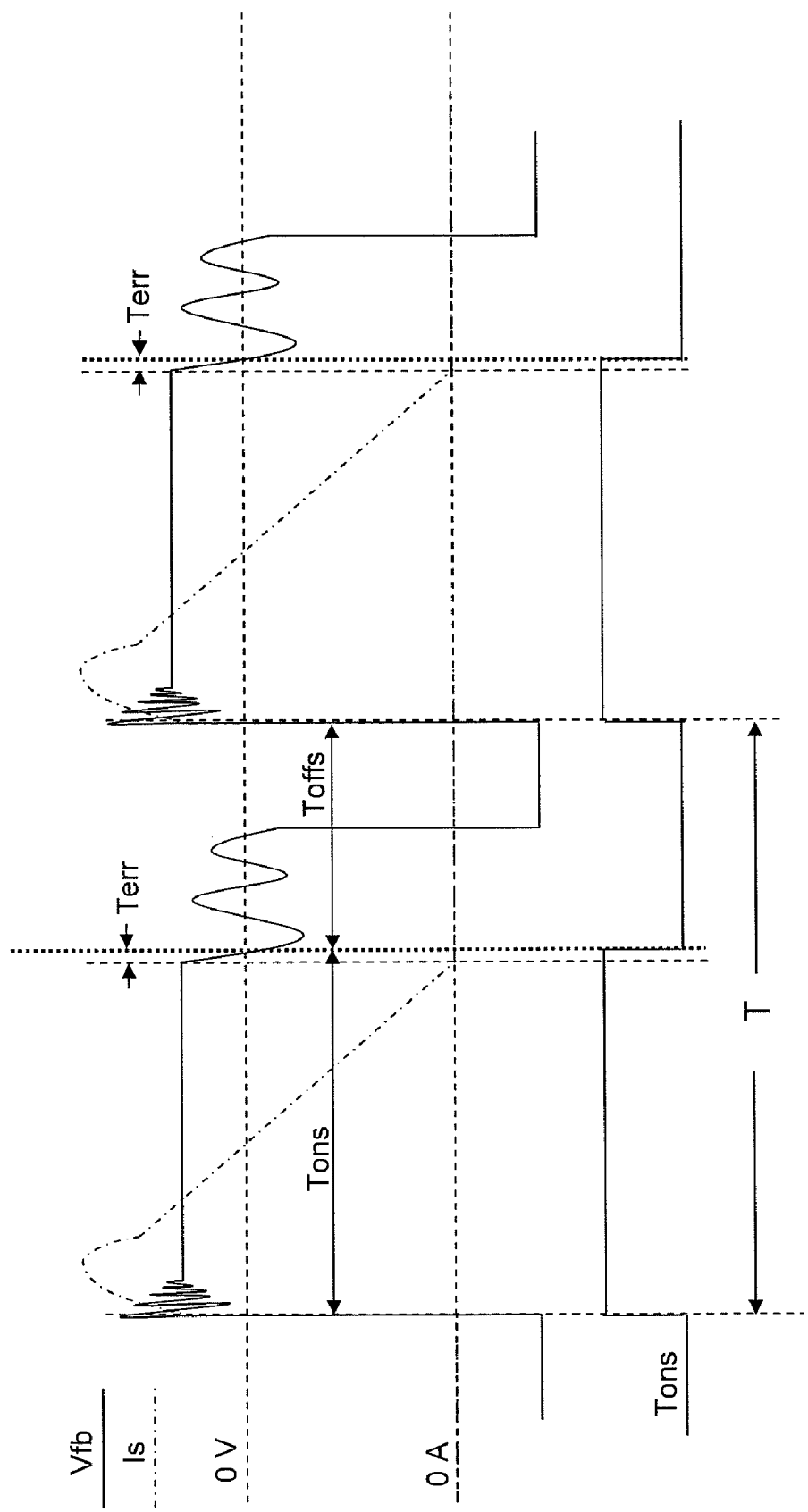
FIG. 5 shows voltage and current waveforms of a rectifying diode and a detected conduction time in a secondary winding of a conventional primary-side regulated switched mode power supply.

FIG. 5 illustrates voltage and current waveforms of a rectifying diode and a detected conduction time in a secondary winding of a conventional primary-side regulated switched mode power supply. FIG. 5 shows the approximate conduction time and non-conduction time interval signals Tons and Toffs and an error time interval Terr of diode 107 in secondary winding 105 of primary-side regulated PFM switched mode power supply 100. Taking into account the error time Terr in the zero-crossing of feedback signal Vfb, an accurate conduction time interval signal Tons0 is thus:

$$Tons0 = Tons - Terr \quad (3)$$

and the average system output current can be theoretically calculated with the expression:

$$Isavg = \frac{1}{2}Ipks \cdot \frac{Tons0}{Tons + Toffs} = \frac{1}{2}Ipks \cdot \left(\frac{Tons}{Tons + Toffs} - \frac{Terr}{Tons + Toffs}\right) \quad (4)$$

$$Isavg = \frac{1}{2}Ipks \cdot \left(\frac{4}{7} - \frac{Terr}{T}\right) \quad (5)$$

where T is the switching period of transistor 102, and Ipks is the peak current at secondary winding 105.

For a given flyback-type primary side regulated switching mode power supply with a PFM control, Ipks and Terr have a constant value. In a conventional PFM control circuit, Terr is not zero. When the system operates in the constant current mode, the switching period T of transistor 102 will become larger as voltage Vout is getting lower. Thus, the output current will become larger at low Vout as shown in FIG. 4 and Equation (5). Therefore, Embodiments of the present invention provide methods for compensate conduction time interval signal Tons with a circuit that takes into consideration the error caused by the ringing waveform.

Figure 6:
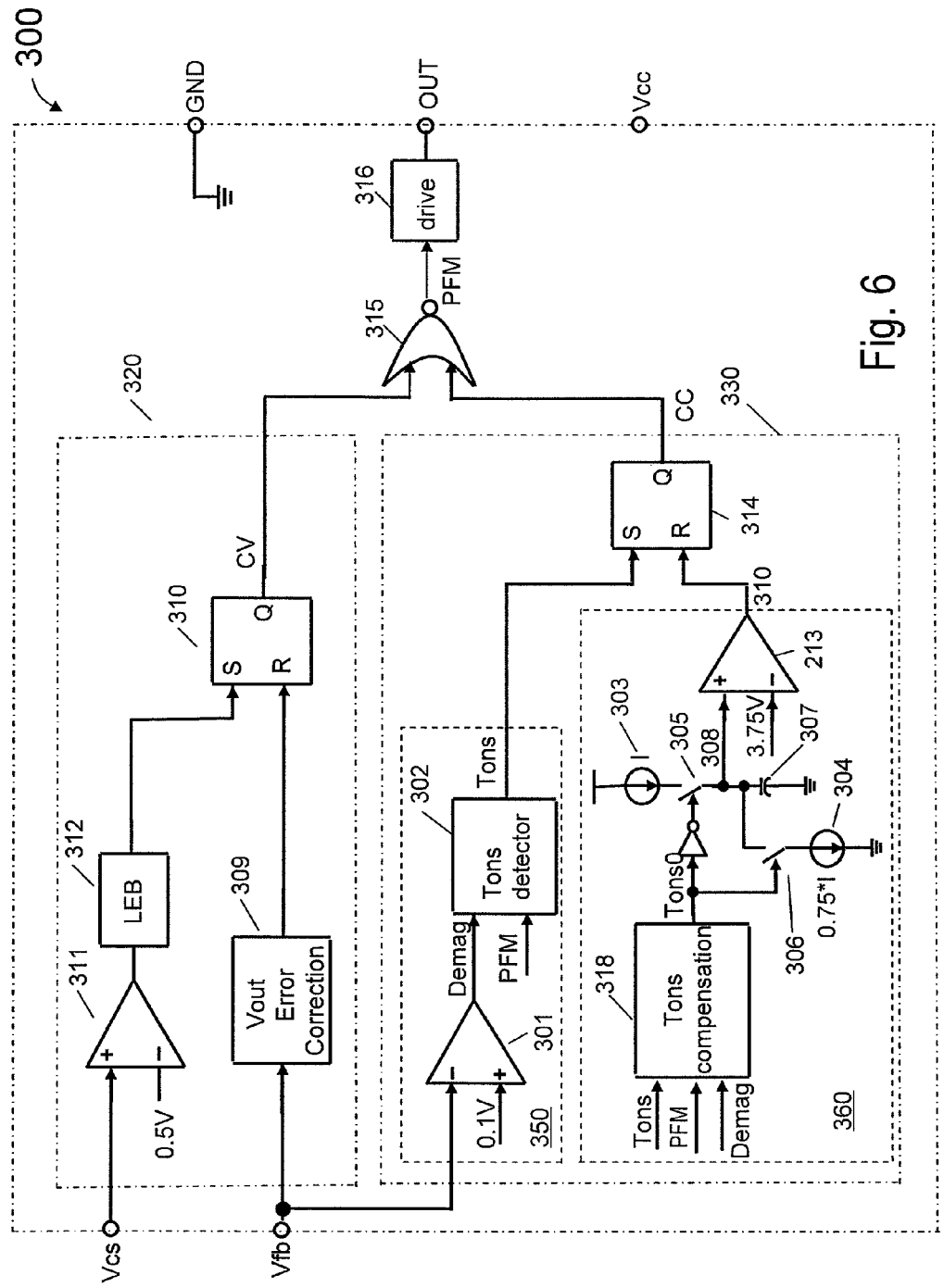
FIG. 6 is a circuit diagram of a constant output voltage and constant output current controller according to an embodiment of the present invention.

FIG. 6 is a circuit diagram of an output voltage and current controller according to an embodiment of the present invention. A controller 300 includes a constant voltage control circuit 320 and a constant current control circuit 330. Controller 300 includes a first input terminal for receiving current sensing voltage Vcs and a second input terminal for receiving feedback signal Vfb. Controller 300 further includes a drive buffer 316, which buffers a pre-driver control signal PFM to an output terminal OUT to drive transistor 102. Constant voltage control circuit 320 is coupled to first and second input terminals and configured to produce a constant voltage control signal CV. Constant voltage control signal CV constitutes a part of pre-driver control signal PFM.

Constant current control circuit 330 includes a current flow detector circuit 350 and a time ratio signal generator circuit 360. Current flow detector circuit 350 receives feedback signal Vfb and pre-driver control signal PFM to produce an approximate conduction time interval signal Tons. Tons is used to set a flip-flop 314, which is reset by a signal 310 of time ratio signal generator circuit 360. Flip-flop 314 provides a constant current control signal CC that is gated with constant voltage control signal CV in a logic gate 315 to produce pre-driver control signal PFM.

Current flow detector circuit 350 includes a comparator 301 that compares feedback signal Vfb with a near zero reference voltage, e.g., 0.1 V, to detect the demagnetization of primary winding 104, denoted as a signal Demag. Since the demagnetization is expressed in Vfb as a damping sinusoidal waveform around the ground potential, signal Demag includes a series of digital pulses or at least one digital pulse having a pulse width equal to about the half of the ringing waveform period. A Tons detector 302 provides an estimated conduction time interval signal Tons in response to pre-driver control signal PFM and signal Demag. An exemplar implementation of Tons detector 302 may be a D flip-flop with the D-input coupled to a power supply, a clock input coupled to pre-driver control signal PFM, and a reset input coupled to signal Demag. Tons may be used to set flip-flop 314 to logic high.

In one embodiment, flip-flop 314 can be an RS flip-flop having an Set input terminal coupled to Tons and an R input terminal couple to the output of time ratio signal generator circuit 360.

Time ratio signal generator circuit 360 includes a capacitor 307, which is charged with a source current 303 through a source switch 305. Capacitor 307 is discharged with a sink current 304 through a sink switch 306. Source and sink switches 305 and 306 are controlled by a compensated conduction time interval signal Tons0 produced by a conduction time compensation circuit 318 having Tons, PFM, and Demag signals as inputs, which will be described in more detail below. When source current 304 is lower than sink current 303, e.g., I304=0.75*I303, the voltage at node 308 will have an asymmetric ramping waveform having a faster rising slope and a slower falling slope. A comparator 213 compares the asymmetric ramping voltage waveform at node 308 with a reference voltage (e.g., 3.75 V in the embodiment shown in FIG. 6) to generate a fixed time ratio signal 310 with an asymmetric duty cycle. In some embodiments, fixed time ratio signal 310 functions as a constant duty cycle control signal, and time ratio signal generator circuit 360 can be referred to as a constant duty cycle control circuit.

Figure 7:
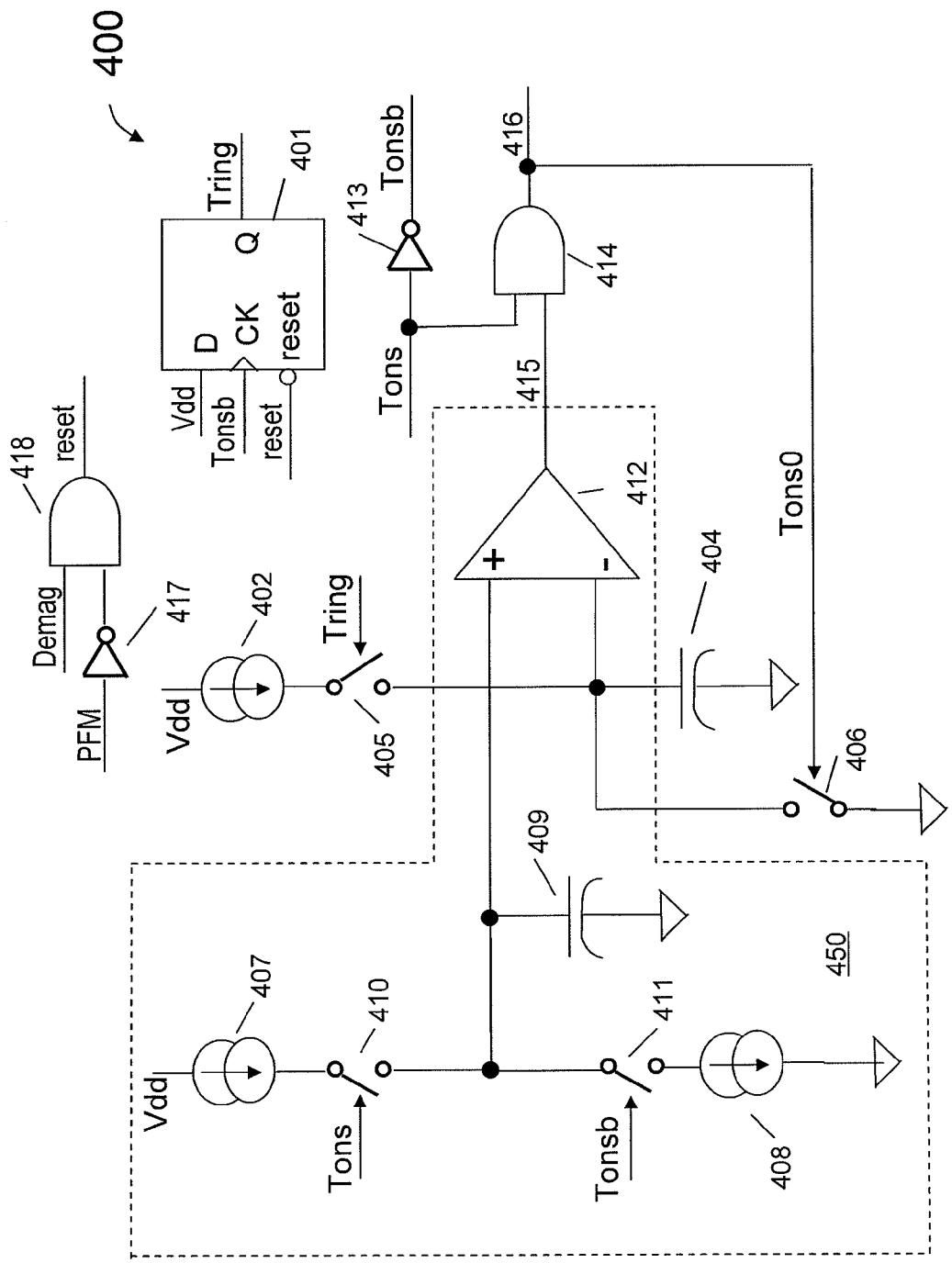
FIG. 7 is a circuit diagram of a conduction time compensation circuit according to an embodiment of the present invention.
Figure 8:
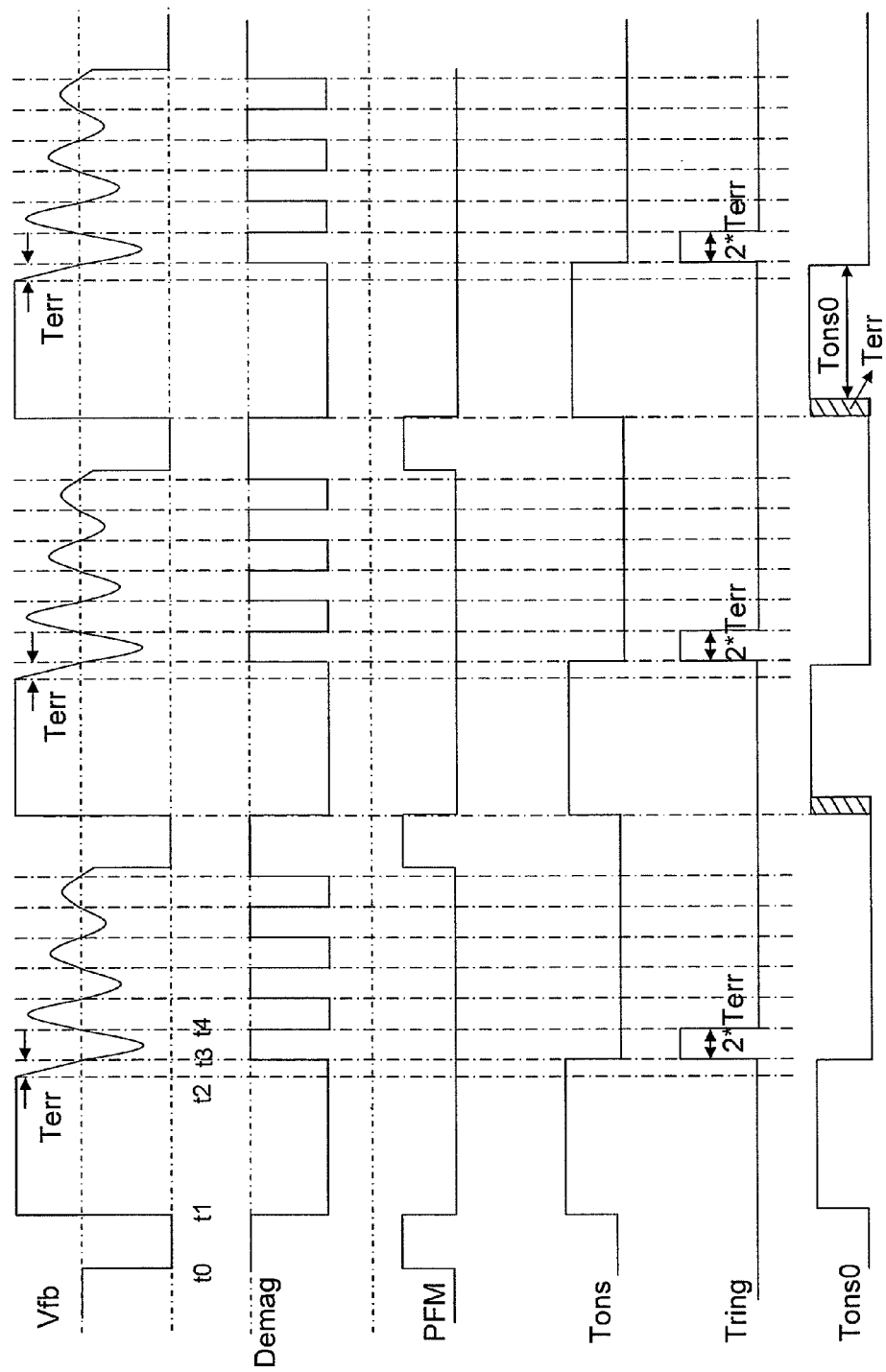
FIG. 8 shows waveforms of selected signals illustrated in FIGS. 6 and 7 according to an embodiment of the present invention.

FIG. 7 is a circuit diagram of a conduction time compensation circuit 400, which is an exemplary embodiment of block 318 in FIG. 6, according to an embodiment of the present invention. Conduction time compensation circuit 400 includes an inverter 413 that inverts conduction time interval signal Tons to an inverted signal Tonsb. Conduction time compensation circuit 400 further includes a D flip-flop 401 having a D input coupled to Vdd, a clock input coupled to inverted signal Tonsb, and a reset input coupled to signal reset. In an embodiment as shown in the upper portion of FIG. 7, the reset input signal is generated by logic gate 418 with Demag and PFM as inputs. D flip-flop 401 thus produces a digital pulse Tring whose pulse width is equal to the half cycle time of the ringing waveform period, as shown in FIG. 8. Digital pulse Tring is converted into a voltage by utilizing a capacitor 404 that is charged with a source current 402 through a switch 405. The charge and therefore the voltage at capacitor 404 is a function of pulse Tring according to the expression:

$$Q = I402 * Tring = C404 * V404 \quad (7)$$

The voltage at capacitor 404 is applied to a negative input terminal of a comparator 412 that is a part of a delay circuit 450.

Delay circuit 450 further includes a capacitor 409 coupled to a source current 407 through a switch 410 and a sink current 408 through a switch 411. Switches 410 and 411 are controlled by respective signals Tons and Tonsb. Because capacitor 409 is charged with current 407 only when switch 410 is turned on, its voltage rising slope will reflect a delay relative to conduction time interval signal Tons. In one embodiment, source currents 402 and 407 have the same current value, and capacitor 409 has a capacitance value half of the value of capacitor 404. Thus, capacitor 409 will reach a voltage value equal to that of capacitor 404 in half of the time Tring. When applying the voltage stored at capacitor 409 to the positive input terminal of comparator 412, a delayed conduction time interval signal 415 with a delay time equal the half of Tring time can be obtained. As the pulse width of Tring is one half period of the ringing waveform, the delay time of the delayed conduction time interval signal 415 is one quarter of the ringing waveform period. Combining conduction time interval signal Tons and delayed conduction time interval signal 415 in a logic AND gate 414 will thus deliver a compensated conduction time interval signal 416 that represents more accurately the actual conduction time of diode 107 in secondary winding 105. Of course, in other embodiments, the compensated conduction time interval signal is related to the cycle time of the ringing waveform and can be selected to suit the specific implementation of the power supply.

In another embodiment, capacitors 404 and 409 may have the same capacitance value. Source current 407 will have twice the current strength of current 402 for capacitor 409 to reach the same charge as that of capacitor 404 in half of the Tring time. One of skill in the art would recognize other variations, modifications, and alternatives to generate a delay time having a quarter of the ringing waveform period.

FIG. 8 shows the waveforms of selected signals illustrated in the circuit diagram of FIGS. 6 and 7. At time t0, switching control signal PFM is at logic high and turns on transistor 102, diodes 107 and 112 are reverse-biased, and conduction time interval signal Tons is at logic low. Feedback signal Vfb is below 0 V and signal Demag is at logic high. At time t1, switching control signal PFM is at logic low, the energy stored at primary winding 104 is transferred to respective secondary and auxiliary windings 105 and 106. Diodes 107 and 112 are conducting, and conduction time interval signal Tons is at logic high. At time t2, primary winding is completely demagnetized, and current Is stops flowing. Feedback signal does not go to zero due to the ringing waveform having a period which is determined by the inductance of primary winding 104 and the total parasitic capacitance. Feedback signal Vfb crosses zero for the first time at the quarter period of the ringing waveform, whereby Tons also goes to zero. Tring is generated by pulse signal generation circuit 401. And compensated conduction time interval signal Tons0 is generated by AND gate 414.

As shown in FIGS. 6 and 8 and indicated in Equations (3)-(6), the elimination of the conduction time error Ten in compensated conduction time interval signal Tons0 will enable PFM controller 300 to accurately control the system output current under different output voltages. Advantages and benefits of compensated conduction time interval signal Tons0 according to embodiments of the present invention is described in more detail in connection with the FIG. 11.

Figure 9:
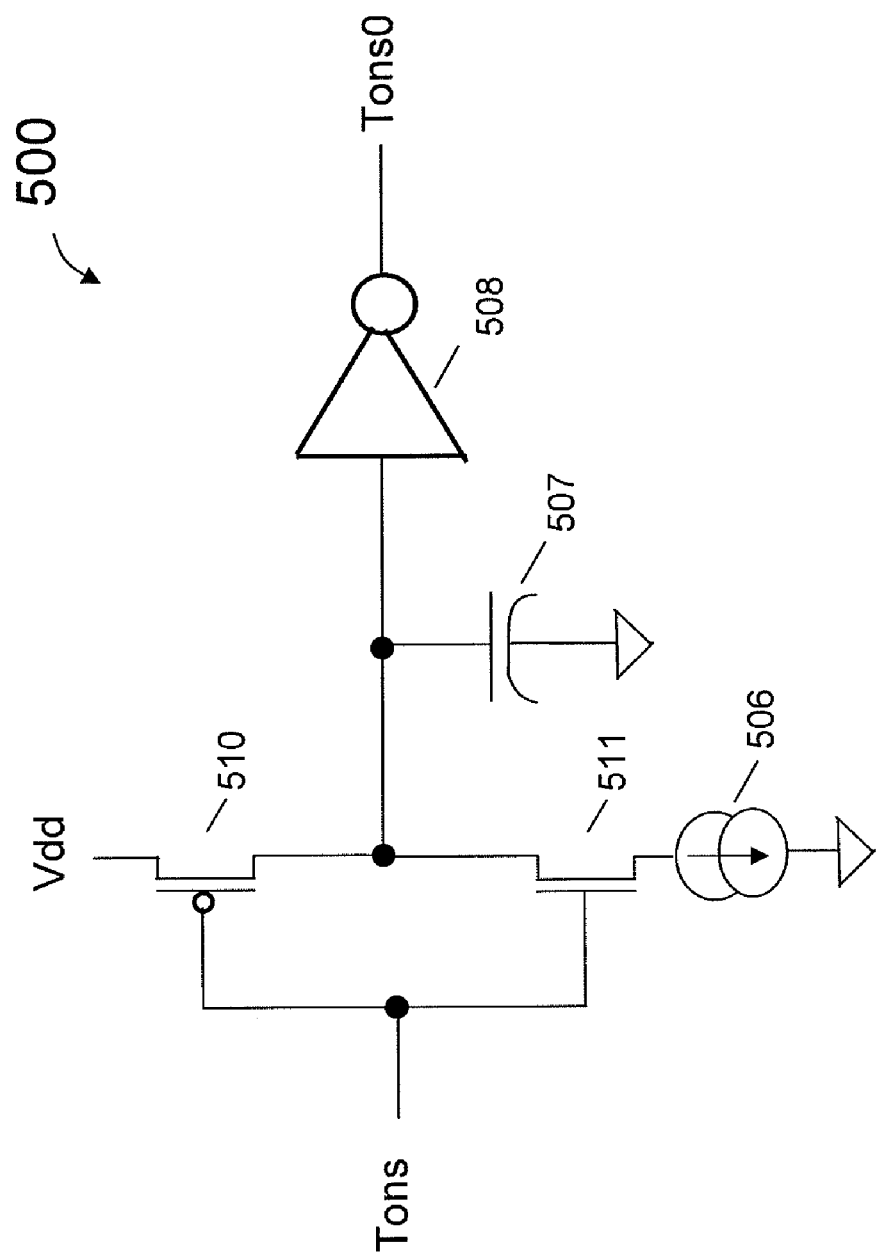
FIG. 9 is circuit diagram of a conduction time compensation circuit according to another embodiment of the present invention.
Figure 10:
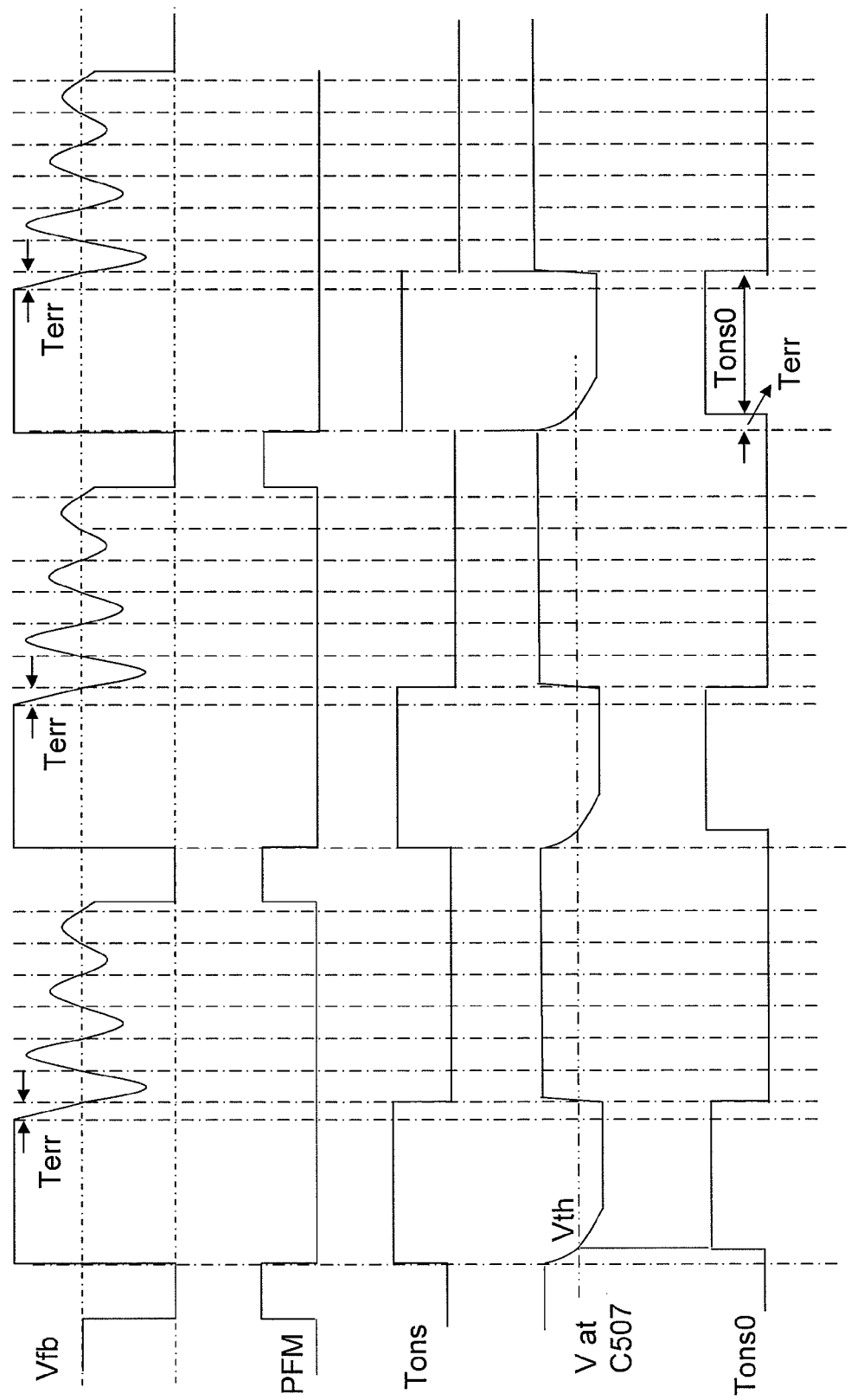
FIG. 10 shows waveforms of selected signals of the circuit in FIG. 9 according to an embodiment of the present invention.

FIG. 9 is a circuit diagram of a conduction time compensation circuit 318 of FIG. 3, according to another embodiment of the present invention. A conduction time compensation circuit 500 includes a current source 506 coupled to a switch 511 to slow down the discharging of a capacitor 507, which is coupled to a power source Vdd through a switch 510. Switch 510 has a low on-resistance so that capacitor 507 can be fully charged very quickly. Switches 510 and 511 are controlled by conduction time interval signal Tons. The voltage at capacitor 507 exhibits an inverted image of Tons with a slow falling edge and a fast rising edge. An inverter or Schmitt-trigger 508 reverses the inverted image of Tons and produces a delayed Tons having a delay time approximating Terr. The delay time can be adjusted by varying either the capacitance value of capacitor 507, sink current 506, and/or the threshold Vth of inverter 508. FIG. 10 shows different waveforms of selected signals of the circuit in diagram in FIG. 9 according to an embodiment of the present invention.

Figure 11:
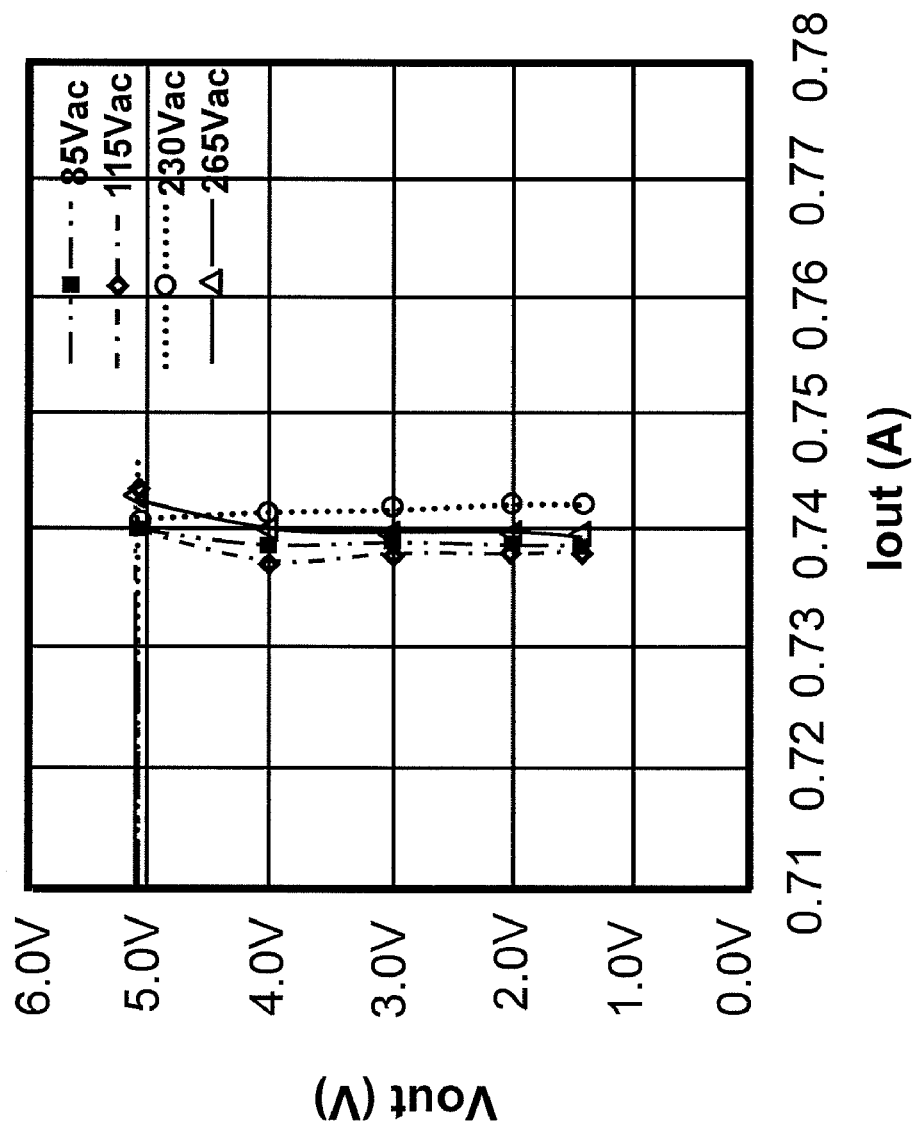
FIG. 11 shows examples of output voltages as a function of output current in a primary-side regulated switched mode power supply according to an embodiment of the present invention.

FIG. 11 shows examples of output voltages as a function of the output current in a primary-side regulated switched mode power supply according to an embodiment of the present invention. As can be seen in FIG. 11, the circuits and methods according to the present invention are suitable to produce a stable output current in a flyback type switched mode power supply as a function of output voltage Vout. The solution is simple and employs only a few circuit elements. In one embodiment of the present invention, the conduction time compensation circuit includes a D flip-flop, charging and discharging current sources, capacitors, switches, comparators, and logic gates. In another embodiment of the present invention, the conduction time compensation circuit includes a capacitor, two switch, a current source, and an inverter.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention.

What is claimed is:

1. A controller for a switched mode power supply (SMPS) including a transformer having a primary winding equipped with a switch, the controller comprising:
    an output terminal for providing a power supply control signal to turn on and off the switch in the primary side of the power supply;
    a first input terminal for receiving a feedback signal related to an output current of the power supply, the feedback signal exhibiting a ringing waveform when the flow of the output current substantially stops;
    a second input terminal for receiving a current sensing signal, which is related to a current in the primary winding;
    a constant voltage control circuit coupled to the first and second input terminals and configured to produce a constant voltage control signal;
    a current flow detector circuit coupled to the first input terminal and configured to produce a conduction time interval signal;
    a time ratio signal generator circuit configured to produce a fixed time ratio signal the time ratio signal generator circuit having a conduction time compensation circuit configured to receive the conduction time interval signal and produce a compensated conduction time interval signal;
    a flip-flop configured to provide a constant current control signal in response to the conduction time interval signal and the fixed time ratio signal; and
    a first logic gate coupled to the constant voltage control signal and the constant current control signal and configured to produce the power supply control signal.

2. The controller of claim 1 wherein the current flow detector circuit comprises:
    a first comparator configured to compare the feedback signal with a first reference voltage for obtaining at least one digital pulse, which is representative of a half-cycle of the ringing waveform; and
    a conduction time detector circuit configured to produce the conduction time interval signal in response to the pre-driver control signal and the at least one digital pulse.

3. The controller of claim 1 wherein the time ratio signal generator circuit further comprises:
    a first capacitor configured to produce a first voltage signal, the first capacitor being charged with a source current through a source current switch and discharged with a sink current through a sink current switch; and
    a second comparator configured to compare the first voltage signal with a second reference voltage and produce the fixed time ratio signal.

4. The controller of claim 3 wherein the source and sink current switches are controlled by the compensated conduction time interval signal.

5. The controller of claim 3 wherein the ratio between the source and sink currents is a fixed value.

6. The controller of claim 1 wherein the conduction time compensation circuit is configured to produce the compensated conduction time interval signal that includes a delay time related to the ringing waveform cycle period.

7. The controller of claim 1 wherein the conduction time compensation circuit is configured to produce the compensated conduction time interval signal that includes a delay time of one quarter of the ringing waveform cycle period.

8. The controller of claim 1 wherein the conduction time compensation circuit comprises:
    a pulse signal generation circuit configured to generate a digital pulse, the digital pulse having the half-cycle period of the ringing waveform;
    a pulse signal-to-voltage conversion circuit configured to convert the half-cycle period to a second voltage signal;
    a delay circuit configured to generate a first delayed conduction time interval signal; and
    a second logic gate configured to combine the conduction time interval signal and the first delayed conduction time interval signal and generate the compensated conduction time interval signal.

9. The controller of claim 8 wherein the pulse signal generation circuit comprises:
a D flip-flop having a data input terminal coupled to a power supply source, a clock input terminal coupled to an inverted conduction time interval signal; a reset input terminal coupled to the at least one digital pulse; the D flip-flop being configured to generate the digital pulse having a half-cycle period pulse width.

10. The controller of claim 8 wherein the pulse signal to voltage conversion circuit comprises:
a second capacitor being discharged by the compensated conduction time interval signal, the second capacitor being charged with a second current source through a second source switch, the second source switch being controlled by the digital pulse.

11. The controller of claim 8 wherein the delay circuit comprises:
a third capacitor coupled to a third current source through a third source switch and configured to produce a third voltage signal the third source switch being controlled by the conduction time interval signal; and
a third comparator configured to compare the third voltage signal with the second voltage signal and produce the first delayed conduction time interval signal with a first delay time.

12. The controller of claim 11 wherein the third capacitor has a capacitance value that is about half of the capacitance value of the second capacitor.

13. The controller of claim 1 wherein the conduction time interval compensation circuit comprises:
a fourth source switch coupled to a power supply source;
a fourth sink switch coupled to a ground potential through a sink current, the fourth source and sink switches being controlled by the conduction time interval signal;
a fourth capacitor being charged through the fourth source switch and discharged through the fourth sink switch, the fourth capacitor being configured to produce a fourth voltage signal having an inverted analog waveform corresponding to the conduction time interval signal with a slow falling edge and a fast rising edge; and
an inverter coupled to the fourth capacitor and configured to convert the inverted analog waveform to a digital signal, which is a second delayed conduction time interval signal having a second delay time.

14. A circuit for providing a constant output current control signal in a switched mode power supply including a primary-side winding coupled to a switch which receives the constant current control signal, and an auxiliary winding providing a feedback signal, the feedback signal being related to a voltage signal in a secondary winding, the circuit comprising:
a first input terminal for receiving the feedback signal, which exhibits a ringing waveform having a cycle period when a current flow in the secondary winding is discontinued;
a current flow detector circuit for receiving the feedback signal and providing a conduction time interval signal; and
a time ratio generator circuit including a conduction time compensation circuit configured to receive the conduction time interval signal and produce a compensated conduction time interval signal a delay time related to the ringing waveform cycle period, the time ratio signal generator circuit being configured to produce a fixed time ratio signal;
wherein the circuit is configured to provide the constant current control signal in response to the conduction time interval signal and the compensated conduction time interval signal.

15. The circuit of claim 14 further comprising:
a constant voltage control circuit configured to produce a constant voltage control signal; and
a first logic gate configured to combine the constant voltage control signal and the constant current control signal and produce the switching control signal.

16. The circuit of claim 14 wherein the current flow detector circuit comprises:
a first comparator configured to produce at least one digital pulse by comparing the ringing waveform with a first reference voltage; and
a conduction time detector configured to produce a conduction time interval signal in response to the at least one digital pulse and the switching control signal.

17. The circuit of claim 14 wherein the time ratio generator comprises:
a first capacitor coupled to a first source current through a first source current switch and a first sink current through a first sink current switch, the first capacitor being configured to produce a first voltage signal; and
a second comparator configured to compare the first voltage signal with a second reference voltage and produce a fixed time ratio signal.

18. The circuit of claim 17 wherein the first source and sink current switches are controlled by a compensated conduction time interval signal.

19. The circuit of claim 14 wherein the conduction time compensation circuit is configured to produce the compensated conduction time interval signal that includes a delay time of one quarter of the ringing waveform cycle period.

20. The circuit of claim 14 wherein the conduction time compensation circuit comprises:
a pulse signal generation circuit configured to generate a digital pulse, the digital pulse having a pulse width equal the half-cycle period of the ringing waveform;
a pulse signal-to-voltage conversion circuit configured to convert the pulse width to a second voltage signal;
a delay circuit configured to generate a first delayed conduction time interval signal; and
a second logic gate, which combines the conduction time interval signal and the first delayed conduction time interval signal to generate the compensated conduction time interval signal.

21. The circuit of claim 20 wherein the pulse signal generation circuit comprises:
a D flip-flop having a data input terminal coupled to a power supply source, a clock input terminal coupled to an inverted conduction time interval signal; a reset input terminal coupled to the at least one digital pulse; the D flip-flop being configured to generate the digital pulse.

22. The circuit of claim 20 wherein the pulse signal-to-voltage conversion circuit comprises:
a second capacitor being charged with a second current source through a second source switch to produce the second voltage signal, the second source switch being controlled by the digital pulse.

23. The circuit of claim 20 wherein the delay circuit comprises:
a third capacitor being charged with a third current source through the third source switch to produce a third voltage signal, the third source switch being controlled with the conduction time interval signal; and a third comparator configured to compare the third voltage signal with the second voltage signal and produce a first delayed conduction time interval signal having a first delay time.

24. The circuit of claim 23 wherein the third capacitor has a capacitance value that is half of the capacitance value of the second capacitor.

25. The circuit of claim 14 wherein the conduction time interval compensation circuit comprises:
   a fourth source switch coupled to a power supply source;
   a fourth sink switch coupled to a ground potential through a sink current, the fourth source and sink switches being controlled by the conduction time interval signal;
   a fourth capacitor being charged through the fourth source switch and discharged through the fourth sink switch, the fourth capacitor being configured to produce a fourth voltage signal having an inverted analog waveform corresponding to the conduction time interval signal with a slow falling edge and a fast rising edge; and
   an inverter or Schmitt-trigger coupled to the fourth capacitor and configured to reverse the voltage signal for generating a second delayed conduction time interval signal having a second delay time.

26. A switched mode power supply (SMPS), comprising:
   a primary-side winding coupled to a switch;
   an auxiliary winding providing a feedback signal, the feedback signal being related to a voltage signal in a secondary winding,
   a control circuit for providing a constant current control signal, the circuit including:
      a first input terminal for receiving the feedback signal, which exhibits a ringing waveform having a cycle period when a current flow in the secondary winding is discontinued;
      a current flow detector circuit for receiving the feedback signal and providing a conduction time interval signal; and
      a time ratio generator circuit having a conduction time compensation circuit configured to receive the conduction time interval signal and produce a compensated conduction time interval signal that includes a delay time related to the ringing waveform cycle period, the time ratio signal generator circuit being configured to produce a fixed time ratio signal;
   the control circuit being configured to provide the constant current control signal in response to the conduction time interval signal and compensated conduction time interval signal.

27. The power supply of claim 26 wherein the current flow detector circuit comprises:
   a comparator configured to produce at least one digital pulse based on the zero crossings of the ringing waveform; and
   a conduction time detector configured to generate the conduction time interval signal.

28. The power supply of claim 26 wherein the conduction time compensation circuit is configured to produce the compensated conduction time interval signal that includes a delay time of one quarter of the ringing waveform cycle period.

29. The power supply of claim 26 wherein the conduction time compensation circuit including:
   a pulse signal generation circuit configured to generate a digital pulse having a half-cycle period pulse width;
   a pulse signal-to-voltage conversion circuit configured to produce a second voltage signal by charging and discharging a second capacitor under the control of the digital pulse;
   a delay circuit configured to produce a delayed conduction time interval signal; and
   a logic gate configured to receive the conduction time and delayed conduction time interval signals for generating a compensated conduction time interval signal.

* * * * *